(No Model.) 2 Sheets—Sheet 1.

R. S. DOBBIE.
ELECTRIC MOTOR FOR WHEELED VEHICLES.

No. 452,992. Patented May 26, 1891.

Witnesses
Geo. W. Breck.
Henry W. Lloyd.

Inventor
Robert S. Dobbie
By his Attorneys
Paget & Kintner (No Model.) 2 Sheets—Sheet 2.
R. S. DOBBIE.
ELECTRIC MOTOR FOR WHEELED VEHICLES.
No. 452,992. Patented May 26, 1891.
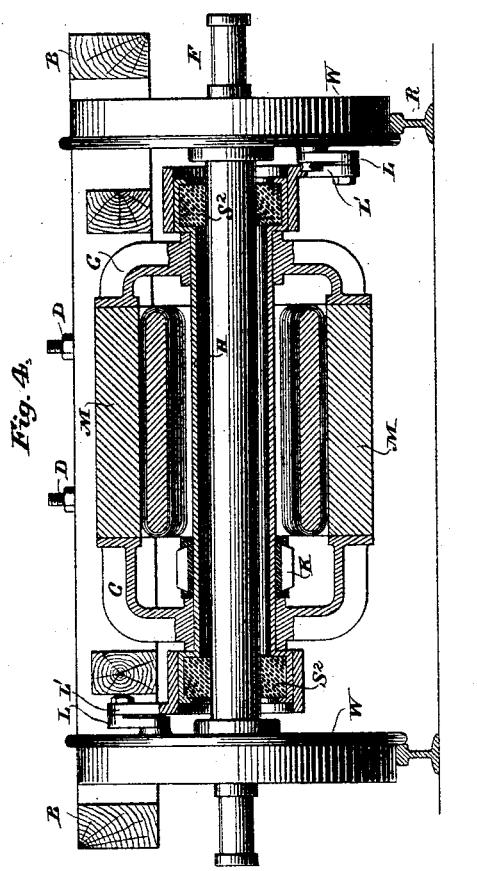
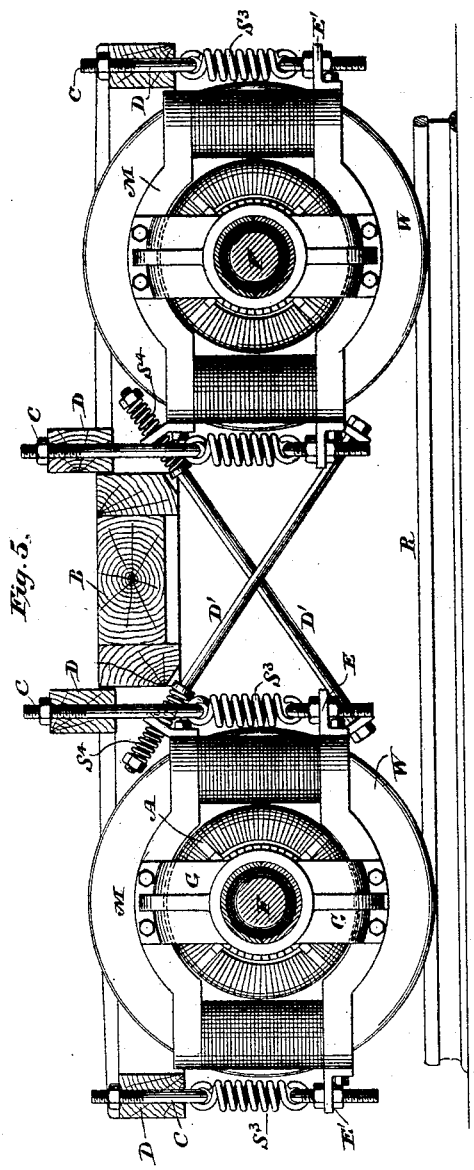
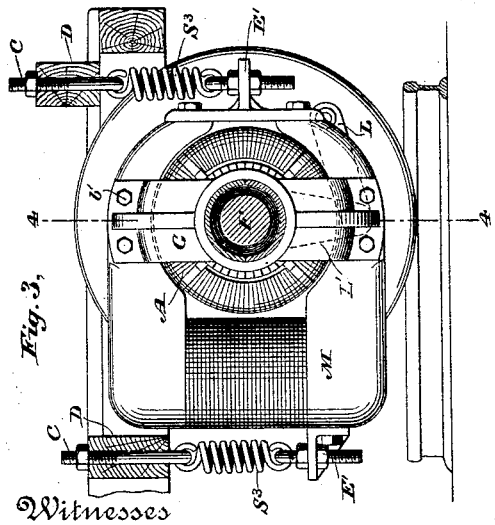
Witnesses
Geo. W. Breck.
Henry W. Lloyd.
Inventor
Robert S. Dobbie
By his Attorneys
Paget & Kintner
THE NORRIS PETERS CO., PHOTO-LITHO., WASHINGTON, D. C.

UNITED STATES PATENT OFFICE.

ROBERT S. DOBBIE, OF JERSEY CITY, NEW JERSEY.

ELECTRIC MOTOR FOR WHEELED VEHICLES.

SPECIFICATION forming part of Letters Patent No. 452,992, dated May 26, 1891.

Application filed May 9, 1890. Serial No. 351,118. (No model.)

*To all whom it may concern:*

Be it known that I, ROBERT S. DOBBIE, a subject of the Queen of Great Britain, residing at Jersey City, in the county of Hudson and State of New Jersey, have made a new and useful invention in the Application of Electric Motors to Wheeled Vehicles, of which the following is a specification.

My invention relates particularly to the application of motors of this type to railway-cars and analogous wheeled vehicles; and its objects are, first, to permit of the direct application of the armature or rotary part to the axle of the driving-wheels, and, second, to avoid as far as possible the rough usage to which this type of propelling-motors is subjected by reason of the continued impact between the wheels and the carrying-rails. I accomplish these objects by the construction and arrangement of parts hereinafter described, but particularly pointed out in the claims which follow this specification.

Figure 1:
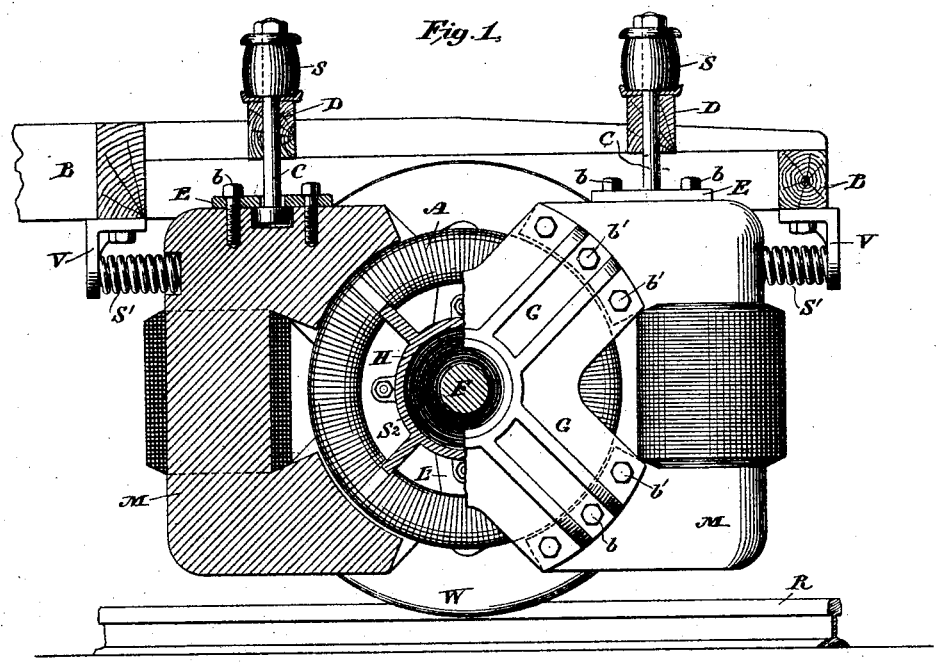
Figure 2:
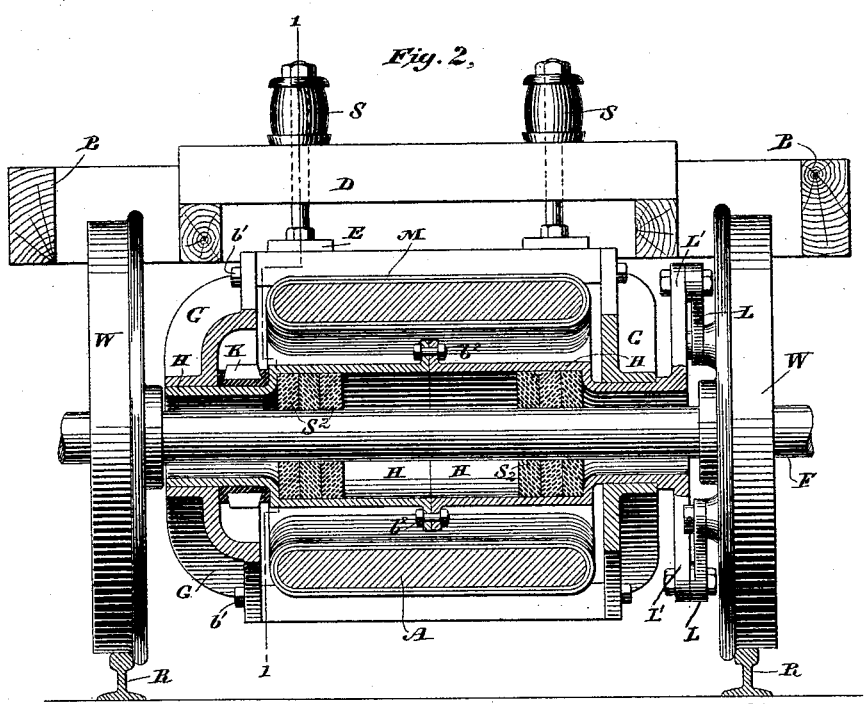

Referring now to the drawings, in which like letters of reference indicate like parts wherever used, Figure 1 is an elevational view, partly in section, of a part of a car-truck, showing my improved apparatus attached. Fig. 2 is a vertical transverse sectional view of Fig. 1, showing a pair of truck-wheels and their axles in elevation. Fig. 3 is a side elevational view of a modified form of my invention. Fig. 4 is a sectional elevational view similar to Fig. 2, showing the connection between the rotary or movable part and the drive-wheels. Fig. 5 is a side elevational view showing my improvement as embodying two motors applied to the adjacent drive-wheels of a truck.

Referring to the drawings in detail, B represents the car or truck frame, which is sustained upon the outer ends of the axle F in the usual way, the journal-boxes and sustaining parts not being shown in the drawings.

W W are the truck-wheels, rigidly secured to the axle F and resting on rails R, of the usual pattern.

M M represent the field-magnets of the propelling-motor, sustained beneath the body or frame of the car B by bolts C passing through the timbers D, said bolts having their heads secured to the field-magnets M in Figs. 1 and 2 by iron plates E E and bolts $b\ b$ and provided at their upper ends with rubber or equivalent springs S.

S' S' are spiral springs having longitudinal bearings against the ends of the motor (see Fig. 1) and angle-irons V V, secured to the body of the car, so that the motor may partake of both vertical and horizontal movements within limits.

H is a hollow sleeve, which surrounds the axle F, and is preferably made in two parts held together by bolts $b^2\ b^2$, and is provided at its outer ends with journal-bearings in the yokes G, bolted to the field-magnets M by bolts $b'\ b'$. This hollow sleeve H rests upon rubber or equivalent spring-disks $S^2$, which fit snugly around the axle F, as clearly shown in Figs. 2 and 4, said disks and sleeve being adapted to rotate with the axle, their functions being to permit the hollow sleeve H to have vertical play of sufficient amount to correspond to that which results from impact shocks between the wheels and rails and the other parts of the motor held in suspension by the bolts C, springs S, and side springs S'. The opposite ends of this hollow sleeve H are provided with radial arms L' L', integral with it, and they in turn are connected by a pair of pivoted link-arms L L to the driving-wheels W W, as clearly shown in Figs. 2 and 4. In Fig. 2 these parts are connected on one side to one truck-wheel, while in Fig. 4 they are diametrically opposite and connected one to each wheel, and the relation of the links L and the arms L' is such as not to interfere with the spring movement given to the hollow sleeve H during any portion of its revolution. The commutator-brushes (not shown) are carried by the yokes G in a manner at once obvious to those skilled in the art.

K K are the commutator-strips, of the usual pattern, secured to the sleeve H, which also carries the armature A, here shown of Gramme type.

In Fig. 3 I have shown a well-known two-pole motor, in which the field-magnet is sustained by the rods C and spiral springs $S^3$, secured to ear-plates E' E', the arrangement of the interior sleeve, which carries the armature A and its connections with the yoke G, being substantially the same as shown in Fig. 2.

In Fig. 5 I show how my improved apparatus may be utilized for a pair of motors attached to adjacent truck-wheels. In this case the motors M are sustained by the rods C and springs S³ in the same manner that the same parts are sustained in Fig. 3, and longitudinal motion is prevented by the tie-rods D' D' and their supporting-springs S⁴ S⁴, said tie-rods being secured to the separate motors by ear-plates, as shown, and provided with adjustable nuts for regulating the elastic relations of the parts. It will be understood, of course, that the tie-rods may be done away with and adjustable tie-springs substituted therefor.

It will be observed that with my improved means of sustaining electric motors beneath car-frames I obviate any undue strain or wrecking influence between the parts and am enabled to attach the rotary part directly to the car-axle, a feature which has not as yet, so far as I am aware, been satisfactorily accomplished.

I am aware that it is old in the art to attach the armature of an electric motor directly to a driving-shaft joining two of the truck-wheels, and I make no claim to this feature, broadly.

I am also aware that it is broadly old in the art to suspend the fixed portion of an electric motor from the bottom of a car and to elastically attach the rotary portion of the motor to one of the axles thereof, and I make no claim, therefore, broad enough to include such construction.

Having thus described my invention, what I claim, and desire to secure by Letters Patent of the United States, is—

1. A wheeled vehicle having an electric motor elastically supported and having its rotary part secured to a hollow sleeve which surrounds an axle of the vehicle and is provided with elastic or yielding bearings at its opposite ends between it and the axle, substantially as described.

2. A wheeled vehicle, in combination with the following elements: an electric motor elastically sustained or supported beneath the vehicle and having its moving part secured to the driving-wheels by one or more link connections, a hollow sleeve which surrounds a shaft of the vehicle, and elastic or yielding bearings between the sleeve and the shaft, substantially as described.

3. A wheeled vehicle having an electrical motor sustained or supported entirely by elastic means and having its rotary or movable part attached to the driving wheels or shaft by a hollow sleeve and one or more link connections, said hollow sleeve being provided with journal-bearings at its opposite ends, and elastic or yielding bearings between it and the shaft, substantially as described.

4. A wheeled vehicle having an electric propelling-motor entirely sustained or supported by electric supporting devices, the armature or rotary part thereof being supported by a hollow sleeve which surrounds the axle uniting the drive-wheels, said sleeve being mechanically attached to the drive-wheels by link connections and provided with yielding or elastic bearings between it and the axle, substantially as described.

5. In a wheeled vehicle, a pair of driving-wheels united by an axle, in combination with a hollow sleeve surrounding the axle, said sleeve having mechanical connection with the rotary part of an electric motor and the aforesaid driving-wheels and elastic or yielding connection between it and the shaft which joins said driving-wheels, substantially as described.

6. A wheeled vehicle having a pair of driving-wheels united by a shaft, in combination with a hollow sleeve surrounding said shaft, said sleeve being rigidly secured to the rotary part of an electric motor and connected mechanically to the driving-wheels and provided with one or more elastic bearings between it and the axle, substantially as described.

7. A wheeled vehicle having an electric motor, the rotary part of which is connected to the driving-wheels by a link connection and the entire motor sustained against vertical and lateral or longitudinal motion by vertical and lateral springs, substantially as described.

8. A wheeled vehicle having an electric motor sustained or supported by springs and its armature connected through a two-part sleeve and link connection with the driving-wheels, said sleeve having elastic or yielding bearings at each end with the axle which joins the driving-wheels, substantially as described.

9. A wheeled vehicle having a pair of driving-wheels connected by a rigid shaft, in combination with a hollow sleeve surrounding said shaft, said sleeve having spring-bearings between it and the shaft and journal-bearings at its opposite ends connected to the body of an electric motor, and additional mechanical connections with the rotary part of said motor and driving-wheels, the said motor being sustained or supported by springs, substantially as described.

10. A wheeled vehicle having a pair of electric motors sustained from the frame of the vehicle by springs, said motors being mechanically joined together by yielding tie-rods, substantially as shown and described.

ROBERT S. DOBBIE.

Witnesses:
C. J. KINTNER,
A. V. HINEY.

It is hereby certified that in Letters Patent No. 452,992, granted May 26, 1891, upon the application of Robert S. Dobbie, of Jersey City, New Jersey, for an improvement in "Electric Motors for Wheeled Vehicles," an error appears in the printed specification requiring the following correction, viz.: In line 65, page 2, the word "electric" should read *elastic;* and that the Letters Patent should be read with this correction therein that the same may conform to the record of the case in the Patent Office.

Signed, countersigned, and sealed this 16th day of June, A. D. 1891.

[SEAL.]

CYRUS BUSSEY,
             *Assistant Secretary of the Interior.*

Countersigned:
 C. E. MITCHELL,
  *Commissioner of Patents.*